United States Patent

[11] 3,581,682

| [72] | Inventor | Edward S. Kontranowski |
| | | Bay City, Mich. |
| [21] | Appl. No. | 801,254 |
| [22] | Filed | Feb. 24, 1969 |
| [45] | Patented | June 1, 1971 |
| [73] | Assignee | Aerospace America, Inc. |
| | | Bay City, Mich. |

[54] DRIVING APPARATUS FOR A WHEELED VEHICLE
14 Claims, 4 Drawing Figs.

[52] U.S. Cl. .................................................. 180/55, 180/66
[51] Int. Cl. ...................................................... B60k 7/00
[50] Field of Search .......................................... 180/66 F, 65, 44 E, 44 F, 44 M, 10, 43 B, 55; 310/67

[56] References Cited
UNITED STATES PATENTS

| 627,133 | 6/1899 | McDougall .................. | 180/65X |
| 856,943 | 6/1907 | Church et al. ............... | 180/65UX |
| 3,184,994 | 5/1965 | Stahl ............................ | 180/43X(B) |
| 3,265,147 | 8/1966 | Coordes ...................... | 180/66X(F) |

*Primary Examiner*—Benjamin Hersh
*Assistant Examiner*—Milton L. Smith
*Attorney*—Learman, Learman & McCulloch ABSTRACT: Driving apparatus for a vehicle having multiple wheels wherein each wheel is equipped with its own, wholly independent driving apparatus operated by either hydraulic or electrical means. The driving mechanism provides power for either driving or braking its associated wheel and it is operable to drive its wheel at a selected one of a number of different speeds or, alternatively, to permit the wheel to rotate freely.

INVENTOR.
EDWARD S. KONTRANOWSKI

INVENTORS
EDWARD S.
KONTRANOWSKI

DRIVING APPARATUS FOR A WHEELED VEHICLE

This invention relates to drive mechanisms for wheeled vehicles and more particularly to a driving mechanism for each wheel of a vehicle, the drive mechanism for each wheel being housed completely within the confines of its wheel and sealed from external factors such as water, sand, dust, and the like. Driving mechanism of the kind with which the invention is concerned is adapted for vehicles operable on rough and uneven terrain, as well as on roads. Such vehicles are used commonly by the military and by sportsmen.

Independent wheel driving mechanisms have been proposed heretofore, but not all of them have been altogether satisfactory for a number of reasons. For example, some of the known mechanisms have included objectionable, protruding transmitting drives, differentials, transmission linkages, and the like which decrease leg room and passenger comfort. Others of the known devices have required front or rear, or both, transverse axles, differentials, and other heavy, expensive apparatus, including complicated brake systems, which add to the cost and weight of such vehicles and, in many instances, limit their use.

An object of this invention is to provide driving mechanism for each wheel of a vehicle and wherein each drive mechanism is wholly contained within its associated wheel, thereby eliminating all need for drive transmitting trains, differentials, transmissions, linkages, and other conventional appurtenances.

Another object of the invention is to provide mechanism of the kind referred to which eliminates the necessity of transverse front and rear axles.

A further object of the invention is to provide a drive mechanism for each vehicle wheel and which is of such nature as to permit the steerable wheels to prevent encumbering the steering linkage, thereby enabling true center point steering to be achieved.

Another object of the invention is to provide an integrated wheel and driving mechanism which resists misalignment, reduces vibration and eliminates the need for individual brake systems.

Other objects and advantages of the invention will be pointed out specifically or will become apparent from the following description when it is considered in conjunction with the appended claims and the accompanying drawings, in which:

Figure 2:
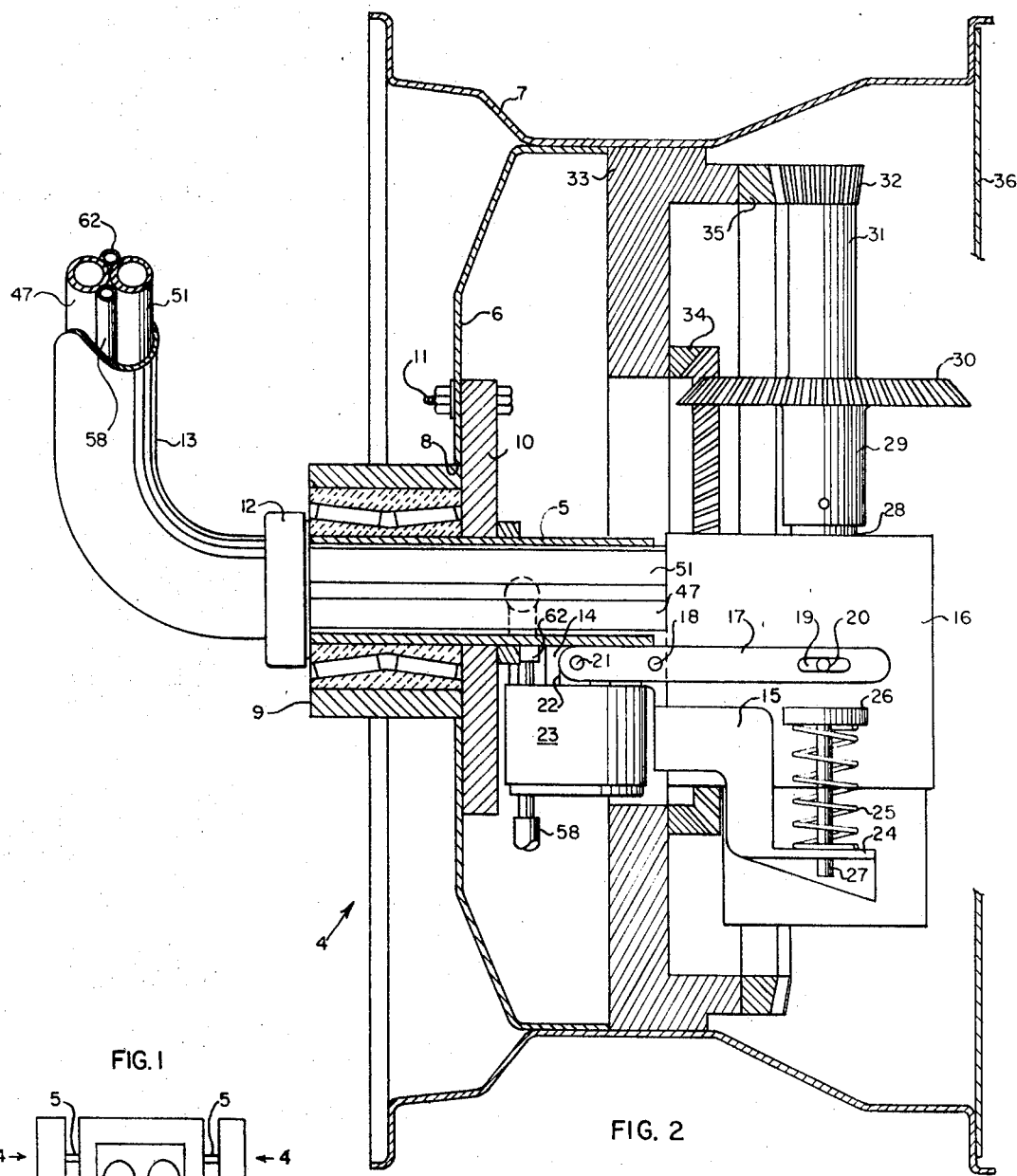
FIG. 2 is an enlarged, vertical sectional view through a typical wheel and illustrating the arrangement of the drive mechanism within the confines of the wheel.
Figure 1:
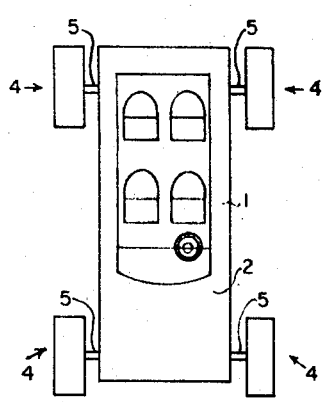
FIG. 1 is a diagrammatic view of a four-wheeled vehicle equipped with apparatus constructed in accordance with the invention.

Apparatus constructed in accordance with the invention is adapted for use in conjunction with a vehicle having a body 1 including an engine compartment 2, a passenger compartment 3 and a plurality of wheels 4. Each wheel 4 is journaled on its own stub axle 5 in a manner presently to be described, and each axle is suspended from the body 1 in any well-known, conventional manner. Certain ones of the wheels 4 will be steerable by steering apparatus (not shown) of conventional construction accessible to the vehicle driver.

Figure 3:
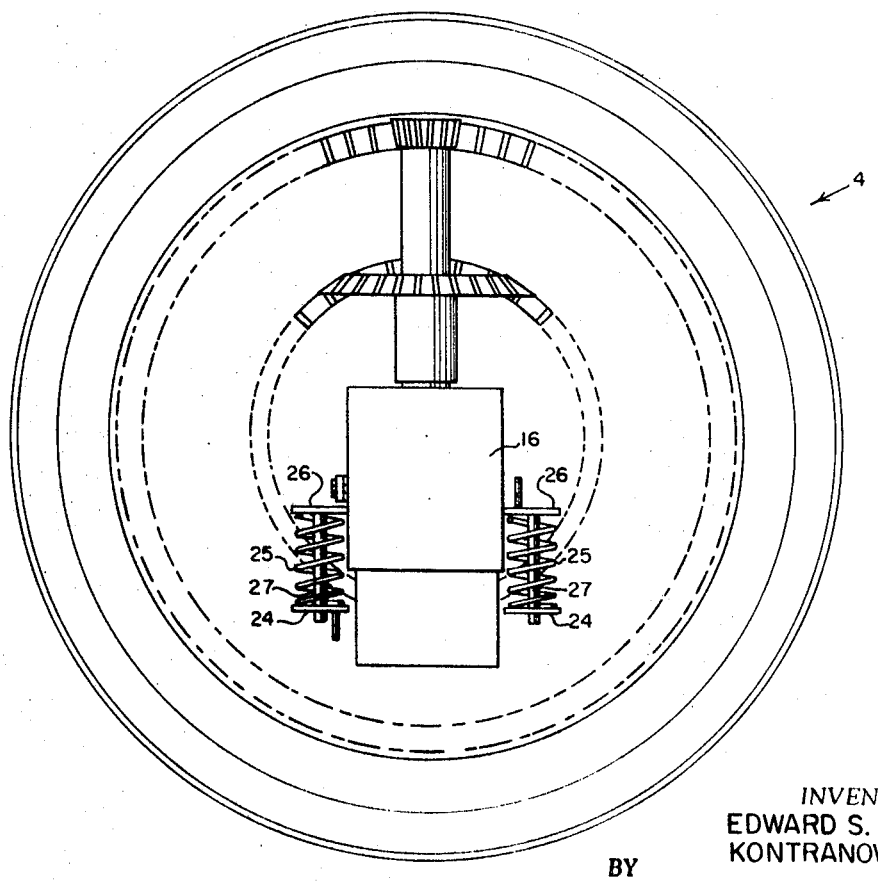
FIG. 3 is a reduced, side elevational view of the apparatus shown in FIG. 2.

A typical wheel 4 is illustrated in FIGS. 2 and 3 and comprises a disc 6 secured at its radially outer edge to a tire mounting rim 7. The disc 6 is provided with a central opening 8 for the accommodation of a bearing assembly 9 by means of which the wheel is journaled for rotation on the axle 5. A backing member 10 is fixed to the wheel disc 6 and both the member 10 and the disc 6 are provided with a plurality of circumferentially spaced openings for the accommodation of mounting bolts 11. Aside from the opening 8 and the openings which accommodate the bolts 11, the wheel disc is imperforate.

The axle 5 is separably coupled at one end by a coupling member 12 to one end of a hollow mounting tube 13 which is secured to the vehicle body 1 by suitable suspension means (not shown). Adjacent its other end the axle 5 is provided with a mounting bracket 14 having a pair of spaced apart arms 15 between which is accommodated a driving motor 16 that may be either electrical or hydraulic. In the disclosed embodiment, the motor 16 is hydraulic.

Means is provided for shifting the motor 16 vertically from the position shown in FIG. 2 and comprises a shifting link 17 pivoted as at 18 to the bracket 14 and having an elongated slot 19 at one end in which is slidably accommodated a pin 20 fixed to the motor 16. The other end of the shifter link 17 is pivoted as at 21 to the piston rod 22 of a cylinder 23 which also is mounted on the bracket 14. In the position shown in FIG. 2, the piston rod 22 is projected from the cylinder 23, but the piston rod may be retracted into the cylinder, thereby effecting counterclockwise rocking of the shifter link 17 about the pivot 18.

Each of the bracket arms 15 terminates in a horizontal foot 24 on which is clamped one end of a coil spring 25. The opposite end of each spring 25 is clamped to an ear 26 carried by and projecting from the motor 16. Each ear carries a guide pin 27 which extends through an opening in its associated foot 24 so as to guide the vertical movements of the motor 16.

The motor 16 includes a driven shaft 28 which extends vertically and which is pinned or otherwise suitably fixed to a sleeve 29 on which is mounted a beveled pinion gear 30. Also fixed to the shaft 28 is a sleeve 31 to which is secured a beveled pinion gear 32 of considerably smaller diameter than that of the gear 30.

Fixed to the wheel rim 7 is an annulus 33 provided with radially inner and radially outer concentric ring gears 34 and 35, respectively. The gear 34 is adapted to mesh with the pinion 30 and the gear 35 is adapted to mesh with the pinion 32.

All of the component parts of the driving mechanism are located fully within the confines of the wheel 4 and are isolated from moisture and other foreign matter by the disc 6 and by a seal 36 which is fixed to and is carried by the rim 7.

Operating means for controlling the operation of the driving mechanism is designated generally by the reference character 40 and comprises a hydraulic torque converter 41 driven by the drive shaft 42 of the vehicle engine 43. The converter 41 is connected by two conduits 44 and 45 to a distribution block 46. Within the block 46 is a passage which communicates with each of four tubes 47, 48, 49 and 50 and with the conduit 44. Within the block 46 is a second passage which communicates with each of four tubes 51—54 and with the conduit 45. The tubes 47 and 51 are associated with the driving mechanism for one wheel, the tubes 48 and 52 are associated with the driving mechanism for a second wheel, and so on.

A second distribution block 55 forms part of the operating means 40 and includes a passage which communicates with the conduit 44 via a tube 56 and a second passage which communicates with the conduit 45 via a tube 57. In communication with the tube 56 are four tubes 58—61 and in communication with the tube 57 are four tubes 62—65. The tubes 58 and 62 are associated with the driving mechanism of one wheel, the tubes 59 and 63 are associated with the driving mechanism of a second wheel, and so on.

The converter 41 is adapted to discharge fluid therefrom either through the conduit 44 or the conduit 45 or through neither conduit, under the control of a manually operated valve (not shown) of known construction and having an operating handle 66. Fluid is adapted to be introduced into the distributor 55 via the tube 56 or the tube 57, or neither, under the control of a valve (not shown) of known construction and operated by a handle 67. The operation of the apparatus 40 will become apparent from a description of the operation of the illustrated wheel driving mechanism.

To condition the apparatus for operation, the engine 43 is started so as to drive the shaft 42 and effect operation of the torque converter 41. When the valve handle 66 is in the position shown in full lines in FIG. 4, fluid will be discharged from the converter 41 through the conduit 44 and into the distributor block 46. Fluid also will be discharged from the distributor block 46 to the distributor block 55 via the tube 56. Fluid introduced from distributor block 46 will be discharged from the latter via the tube 47 into the hydraulic motor 16 so as to effect rotation of the shaft 28 in one direction and, consequently, rotation of the pinions 30 and 32 in the same direction. Inasmuch as the pinion 32 is in mesh with the ring gear 35, the wheel 4 will be rotated in one direction.

Fluid discharged from the motor 16 is returned via the tube 51 to the distributor block 46 whence it returns to the torque converter 41 via the conduit 45.

Figure 4:
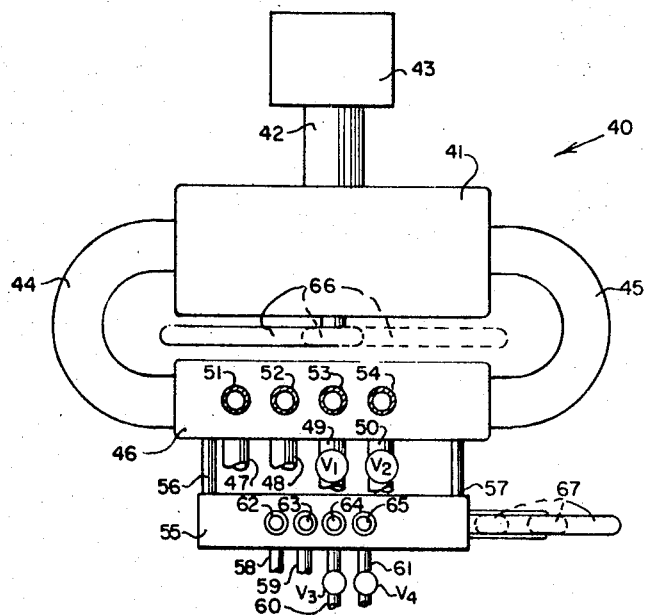
FIG. 4 is a diagrammatic view of pressure fluid operating means and control means therefor.

When the valve handle 66 is in the position shown in FIG. 4, fluid from the distributor 46 will be discharged to the driving mechanism of a second wheel via the tube 48 and returned via the tube 52. Fluid also will be discharged from the distributor block 46 via the tubes 49 and 50 to third and fourth wheel driving mechanisms and returned to the block via the tubes 53 and 54, respectively. In the tubes 49 and 50, however, are located manually operable valves V-1 and V-2 by means of which operation of the driving mechanisms associated with the tubes 49 and 50 may be disabled. In practice, the tubes 49 and 50 will be associated with the front wheels of a vehicle so as to enable the front wheels to be driven or freewheeling, as desired by the vehicle operator.

As long as the valve operating handle 66 remains in the full line position shown in FIG. 4, the driven wheels will be rotated in the same direction. When the handle 66 is rotated through 180°, however, fluid is discharged from the converter 41 through the conduit 45 to the block 46, and is discharged from the block 46 through the lines 51—54 to the respective driving mechanisms. Fluid from the driving mechanisms is returned to the block 46 via the lines 47—50 and thence through the conduit 44 to the converter 41. In this instance, therefore, the wheels associated with the respective driving mechanisms will be rotated in the reverse direction from that described earlier.

When the valve handle 66 is rotated 90° from the full line position shown in FIG. 4, no fluid is discharged from the converter 41. Thus, the several driving mechanisms are not driven by the converter 41, but instead, are locked in a nonrotatable condition as long as one of their driving pinions remain in mesh with the associated ring gears. The rate of movement of the valve handle 66 from the full line or open position to the 90° or closed position determines the rate at which the respective drive mechanisms are slowed or braked. Conversely, the rate of movement of the valve handle 66 from its closed position to either of its operating positions determines the rate at which the respective driving mechanisms are accelerated.

The position of the pinions 30 and 32 with respect to their respective ring gears 34 and 35 is determined by the position of the valve handle 67. When the latter is in the full line position shown in FIG. 4, the piston rod 22 associated with the cylinder 23 is in its projected position. As a result, the motor 16 and the pinion 30 and 32 are in their lowermost positions, thereby effecting engagement between the gears 32 and 35 and permitting the gears 30 and 34 to be disengaged. When the handle 67 is located 180° from the position shown in FIG. 4, however, fluid is delivered via the tubes 58—61 to the associated cylinders 23 so as to retract the piston rods 22 and effect vertical shifting of the associated motors 16, thereby disengaging the pinions 32 from the gears 35 and engaging the pinions 30 with their gears 34. Due to the different diameters of the pinions 30 and 32, the rate at which the respective wheels 4 are driven by engagement of the pinions 30 and ring gears 34 will be different from the rate at which they are driven by the other gears.

When the handle 67 is shifted 90° from its fully open position as shown in full lines in FIG. 4, the hydraulic forces acting on the associated cylinders 23 will be neutralized, thereby permitting the respective motors 16 to occupy a neutral position in which neither of the pinions 30 and 32 is engaged with its associated ring gear. The neutral position of each motor is controlled by the springs 25 which are of such length and such capacity as normally to bias the motors from either of their two operative positions toward the neutral position.

In those instances when it is not desired to operate all of the wheel driving mechanisms, those driving motors 16 which have been disabled by operation of valves V-1 and V-2 may be located and locked in their neutral positions by manipulation of valves V-3 and V-4 in tubes 60 and 61, respectively, which will preclude the application of hydraulic forces on the associated cylinders 23 regardless of the position of the operating handle 67. Thus, whenever the remaining wheel driving mechanisms are shifted into their neutral, forward or reverse positions, there will be no change in the condition of the mechanisms which have been neutralized by manipulation of the valves V-3 and V-4.

The disclosed embodiment is representative of the presently preferred form of the invention, but is intended to be illustrative rather than be definitive thereof.

I claim:

1. Wheel driving apparatus comprising axle means; a wheel journaled on said axle means; a plurality of concentric annular gears fixed to said wheel; rotatable pinion means; means mounting said pinion means for movements into and out of driving engagement with said gears; and shifting means for effecting such movements of said pinion means, said gears said pinion means, said mounting means and said shifting means being located wholly within the confines of said wheel.

2. The apparatus set forth in claim 1 wherein said shifting means is pressure fluid operated.

3. The apparatus set forth in claim 1 including seal means secured to said wheel and overlying said annular gears.

4. The apparatus set forth in claim 1 including motor means for rotating said pinion means.

5. The apparatus set forth in claim 4 wherein said motor means also is located within the confines of said wheel.

6. The apparatus set forth in claim 4 wherein said motor means is reversible.

7. The apparatus set forth in claim 6 including pressure fluid operating means for said motor means and means for regulating said operating means.

8. The apparatus set forth in claim 1 wherein said pinion means comprises a plurality of pinions corresponding in number to the number of said annular gears and spaced from one another radially of said axis.

9. The apparatus set forth in claim 8 wherein the spacing between said pinions differs from the spacing between said annular gears whereby only one pinion may engage an annular gear at any one time.

10. The apparatus set forth in claim 9 including biasing means acting on said pinion means and urging the latter toward a position in which none of said pinions engages any of said annular gears.

11. The apparatus set forth in claim 8 wherein each of said pinions is of different diameter.

12. Wheel driving apparatus comprising axle means; a wheel journaled on said axle means; a plurality of concentric annular gears fixed to said wheel; a plurality of rotatable, different diameter pinions; means mounting said pinions for shifting movements of any selected one thereof from a neutral position into and out of driving engagement with a selected one of said gears; means biasing said pinions to said neutral position; shifting means operable to overcome said biasing means and shift a selected one of said pinions into driving engagement with a selected one of said gears; reversible motor means for driving said pinions in a selected one of either of two directions; and means for changing the direction of drive of said motor means regardless of which one of said pinions and gears are in driving engagement.

13. The apparatus set forth in claim 12 wherein said annular gear means gears correspond in number to the number of said pinions.

14. The apparatus set forth in claim 12 wherein said motor means is pressure fluid operated.